Aug. 5, 1969 R. H. TAPLIN 3,460,058
RADIO SONOBUOY
Filed Oct. 25, 1960 3 Sheets-Sheet 2

INVENTOR.
RONALD H. TAPLIN
BY Isidore Togut
ATTORNEY

Aug. 5, 1969  R. H. TAPLIN  3,460,058
RADIO SONOBUOY
Filed Oct. 25, 1960  3 Sheets-Sheet 3

INVENTOR.
RONALD H. TAPLIN
BY *Isidore Togut*
ATTORNEY

United States Patent Office

3,460,058
Patented Aug. 5, 1969

---

3,460,058
RADIO SONOBUOY
Ronald H. Taplin, Nutley, N.J., assignor to International Telephone and Telegraph Corporation, Nutley, N.J., a corporation of Maryland
Filed Oct. 25, 1960, Ser. No. 64,869
Int. Cl. G01s *1/72;* H04b *13/00*
U.S. Cl. 340—2                                     5 Claims

---

ABSTRACT OF THE DISCLOSURE

An air-dropped sonobuoy including a fast sinking portion containing a sound detector. The detector is suspended below the thermocline regions of the ocean to provide for long range submarine detection.

---

This invention refers to a system for sound detection below the surface of a body of water and more particularly to a radio sonobuoy.

Conventional Sonar systems for the detection of submarine operate at generally short depth below the surface of the ocean. The problems involved in deep water operation are extremely formidable. By deep water operation is meant operation at depths of several thousand feet below the surafce of the water. However, operation at comparatively shallow depth within the water has many limitations. Among them is the fact that temperature bending occurs in the thermocline region which exists generally in depths up to 600 feet below the surface. It has been determined that the temperature varies for different depths in the water in the shallow thermocline regions and these temperature layers bend the rays for any sonar operating in this thermocline region and therefore long range detection is practically impossible to secure. There also occurs a convergent zone bending caused by the pressure velocity profile which bends the sound waves transmitted by an object in the water in a direction which effectively bypasses Sonar detection apparatus that is situated in the shallow thermocline region.

It is therefore an object of this invention to provide a radio sonobuoy system which will operate more efficiently than conventional Sonar systems.

Another object is to provide an improved radio sonobuoy capable of operating at great depths below the surface of the ocean.

A feature of this invention is a radio sonobuoy adapted to be dropped from high altitudes above the surface of a body of water comprising a first portion for controlling the descent of the sonobuoy in the air in two phases, the first phase allowing the sonobuoy to fall in a free fall fashion like a bomb and the second phase slowing the fall of the sonobuoy so that it will strike the surface of the ocean with a minimum of force and will thereby not sink to any great depth below the surface of the water and will cause no injury to the electronics carried by the sonobuoy. A second portion of the sonobuoy contains a transmitter and is adapted to float on the surface of the water and there is a third portion of the sonobuoy which is adapted to sink to great depths within the water and contains sound detection means, such as a hydrophone. The third portion contains a cable which couples it and the hydrophone to the second portion floating on the surface and in such a way that it permits the third portion to sink at high speed to a predetermined depth below the surface of the water.

Another feature of this invention is the unique method of packaging the cable which couples the third portion of the sonobuoy containing the hydrophone to the second portion by stowing the cable within the third portion and thereby insuring a minimum drag payout which enables the third portion of the sonobuoy to sink at an extremely fast rate within the water.

The above-mentioned and other features and objects of this invention will become more apparent by reference to the following description taken in conjunction with the accompanying drawings, in which.

In the search for improved performance in the detection of submarines or other underwater objects, the prospects of operating Sonar systems at great depth offers a new dimension in system performance. Heretofore operation of Sonar systems in deep waters has not been attempted because the problems involved in such operations are very formidable especially in view of the great pressures involved. It has, however, been determined through exhaustive studies and experiments that Sonar operation at great depth can be much more efficient than the conventional method of Sonar detection at comparatively shallow depth.

Figure 1:
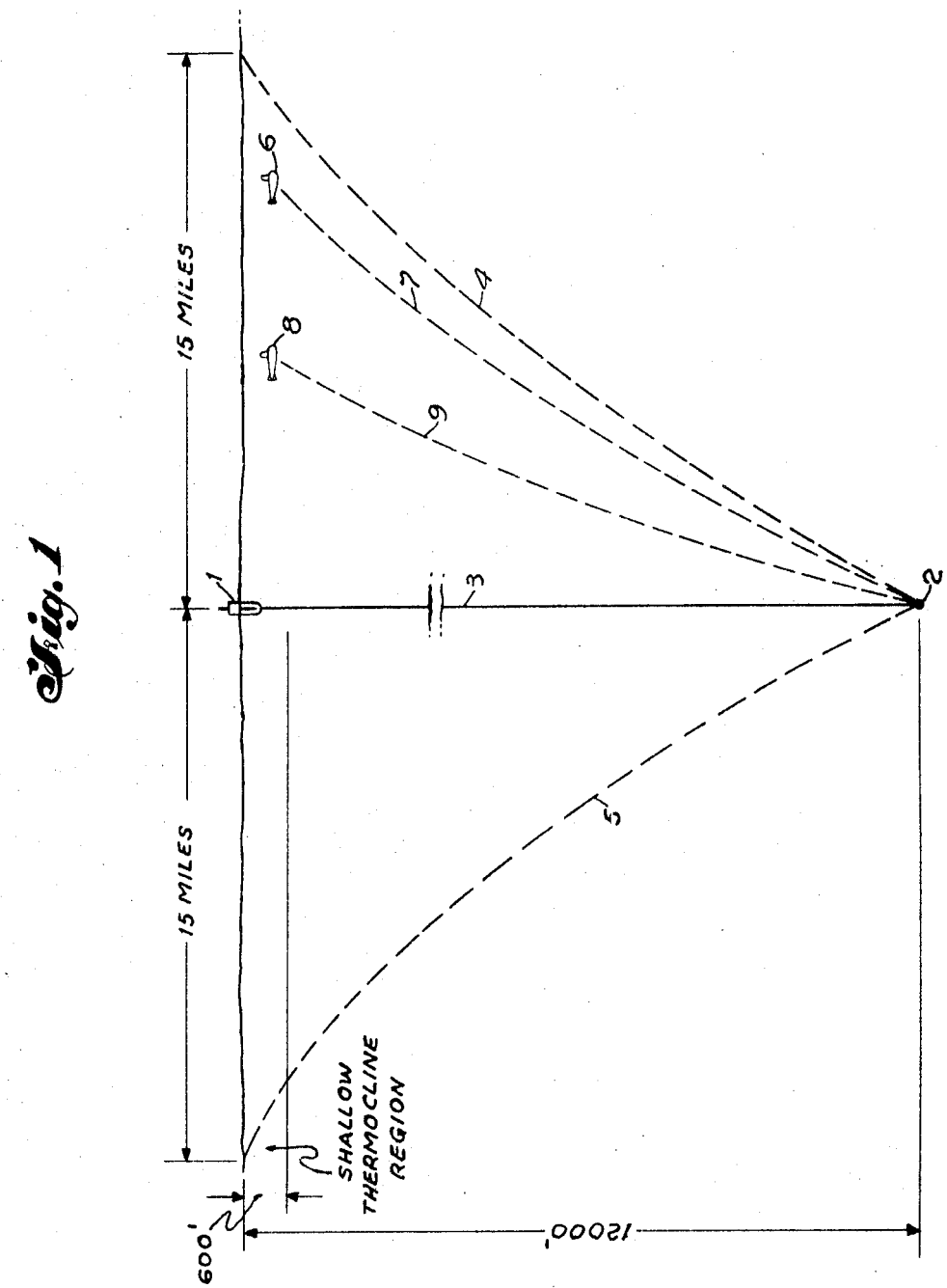
FIG. 1 is a diagram useful in illustrating the theoretical discussion on which this invention is based.

Referring now to FIG. 1, there is shown a diagram to illustrate the theory upon which this invention is based. A sonobuoy 1 of this invention is shown floating on the surface of the water for transmitting signals received by a hydrophone 2 which, in this case, is shown at a depth of approximately 12,000 feet below the surface of the water. A cable 3 connects the hydrophone 2 to the transmitter portion 1 of the sonobuoy. The shallow thermocline region in the ocean is situated in the zero to 600 foot depth below the surface of the water. In this region, there are temperature layers. Because of the bending of SONAR rays within the thermocline region, it is almost impossible to secure long range detection of submerged objects or any object on the surface of the water generating sound waves. It has been determined that within a radius of 15 miles a hydrophone located at a depth of 12,000 feet will be able to detect Sonar waves emitted by underwater objects more efficiently than Sonar systems operating within the thermocline region. This is because the pressure velocity profile of sound waves in water assumes a convergent path as shown by the broken lines 4 and 5 which extend from the outward limit of 15 miles curving downwardly towards the hydrophone 2 which is on the center axis of the 15 mile radius circle. Similarly, sound waves from an underwater object 6 will assume the convergent path 7 and sound waves from a second underwater object 8 will assume the convergent path 9. Effectively, a hydrophone located at the depth of 12,000 feet can see up from the depth through the temperature layer gradients and thus obtains a freedom from variations due to the temperature differentials in the water that bend the sound waves traveling horizontally through the water from conventional Sonar devices.

Figure 2:
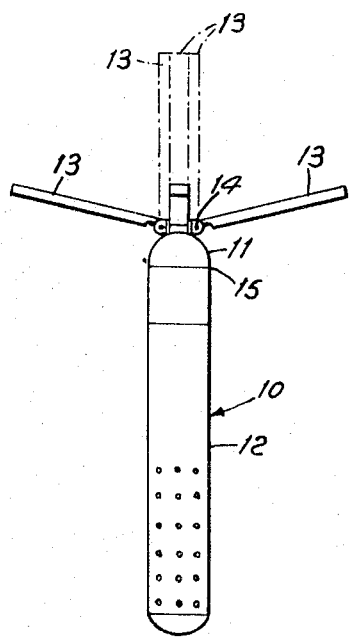
FIG. 2 is a view of the assembled sonobuoy.

Referring to FIG. 2, there is shown the radio sonobuoy 10 which is composed of a first portion 11 and a second portion 12, the third portion, which will be described later, being encased within the second portion 12. The first portion 11 of the sonobuoy has four rotovanes 13, which are spaced 90° apart and are shown in the horizontally extended position when the sonobuoy is in the second phase of the descent through the air. In the first phase, the rotovanes 13 as indicated by the broken lines are shown in the vertical position wherein the sonobuoy will drop and fall through the air as a bomb in free fall. As shown by the vertical position of the rotovane blades 13, the rotovane blades are allowed to stream to a non-rotating, stabilizing fin configuration to insure a stable bomb-like projectory of the radio sonobuoy from high altitude. Upon reaching a preset altitude or following a time delay or pressure change, a spring actuating mechanism imparts (not shown) a spin through the rotovane assembly and by virtue of the rotovane hinge 14, the rotovane 13 by centrifugal force assumes an angle of attack in a rotating mode which insures that autorotation occurs in the sonobuoy rotochute and produces reduced speed to the sea surface. In effect the autorotation of the vanes is equivalent to the retarding action of a parachute. An example of such a rotovane structure which is suitable for use in this invention is disclosed in the publication "Handbook of Maintenance Instructions for Listening Sonobuoy," AN/SSQ-2 (XN-1), published by direction of the Chief of the Bureau of Aeronautics, Department of the Navy, as approved for unrestricted publication Feb. 11, 1955. It is, of course necessary to have minimum impact of the sonobuoy on the water. Upon reaching the water and submergence therein to the depth of a few feet the stabilizing portion 11 of the sonobuoy 10 detaches at the junction 15 and falls away therefrom leaving the other two portions of the sonobuoy floating in the water together. The attachment of portion 11 to portion 12 of the sonobuoy may be made by means of water soluble cement which on contact with the sea water will thereupon dissolve and permit the separation of the two parts. Other means of attaching the two together by means of spring clips or otherwise which will then unfasten when the sonobuoy hits the water can, of course, be utilized.

Figure 3:
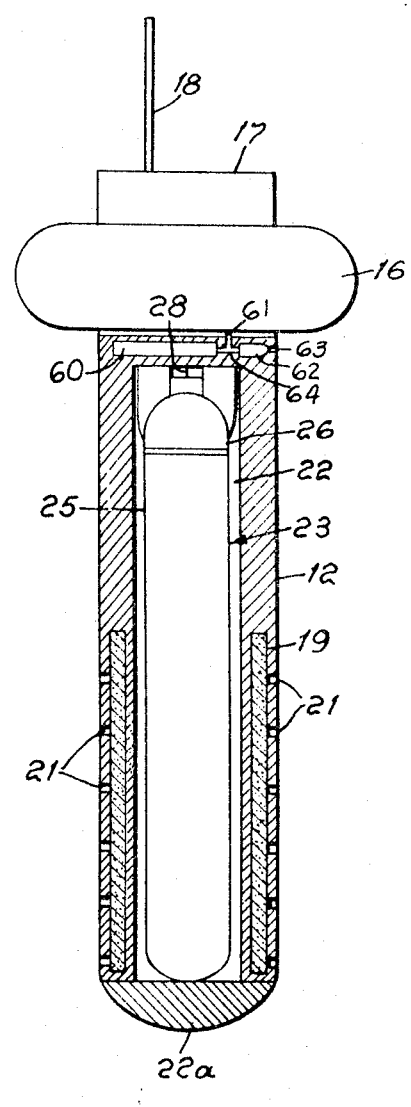
FIG. 3 is a view in section of the second and third portions of the sonobuoy.
Figure 4:
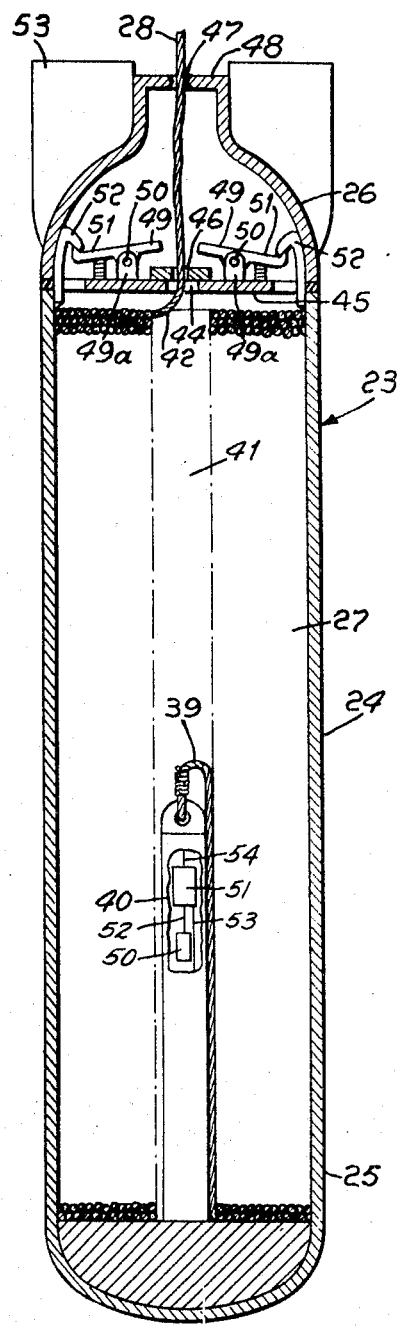
FIG. 4 is a section view of the third portion of the sonobuoy.

Referring more particularly to FIGS. 3 and 4 when the portion 12 strikes the water, the inflatable buoyancy rings 16 are inflated by air released from a compressed air or gas container carried by the sonobuoy. A device for actuating the compressed gas container to release the gas therein is, for example, a submersion actuator for rafts and other inflation equipment which is manufactured by Walter Kidde and Company, Inc., Aviation Division, Belleville, 9, N.J., and described in their catalog entitled "Kidde Inflatair Units," published April 1958. As explained therein, the submersion actuator operates on contact with salt water to release the gas from the gas container to inflate the inflation equipment. As shown in FIGURE 3, a gas container 60 is disposed adjacent to the inflatable rings 16 and connected thereto by tube 61. The submersion actuator 62 is disposed adjacent to the gas container 60 and to the side opening 63 in the portion 12 and connected to the gas container by tube 64. The top portion 17 of the sonobuoy contains the transmitter electronics which for convenience and packaging and for small size should be of the solid state design. An antenna 18 protrudes from the top of the sonobuoy 12 floating clear of the water. At the lower portion of the sonobuoy 12 and in a space 19 within the casing 20 of the sonobuoy 12 are disposed batteries which are activated when permeated with sea water. To effectuate the entrance of sea water in the battery space, holes 21 are drilled in the outside wall of the casing 20. Within a cavity 22 in the center of the casing 20 is disposed the third portion 23 of the sonobuoy 1. This portion 23 is that part of sonobuoy which detaches therefrom and sinks downward into the ocean depth. A cover 22a closes the cavity 22 with the sonobuoy portion 23 therein. This cover 22a may be fastened to the casing 20 by means of water soluble cement which on contact with the water will dissolve and drop away permitting the sonobuoy portion 23 containing the hydrophone to emerge from the cavity 22 and sink into the ocean depth. The third portion 23 consists of a cylindrical container 25 and a cover 26. Disposed within the container 25 is a coil 27 which contains the cable 28 tightly wound therein in a specific manner which will now be described with reference to FIG. 5.

Figure 5:
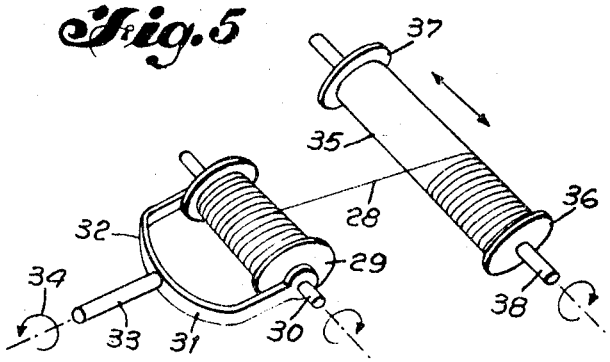
FIG. 5 is an illustration showing a method of coiling the cable which is to be stowed within the third portion of the sonobuoy.

FIG. 5 shows the method of winding the cable 28 in the correct manner both for playing out of the sonobuoy portion 23 and for the maximum stowage in the minimum space. The cable 28 is unwound from a spool 29 which is supported on a shaft 30, shown in diagrammatic form, and can rotate thereabout. Shaft 30 is supported in turn by two arms 31 and 32 which are coupled to another shaft 33 which is rotated in the direction indicated by the arrow 34 by a source of power not shown. The effect of the rotation about the shaft 33 is to impart a twist to the cable 28 as it unrolls from the spool 29 onto a mandrel 35. The cable 28 is thus twistingly wound about the mandrel 35 between the limits defined by the end plates 36 and 37 as the mandrel 35 is rotated by the shaft 38 by a source of power not shown. After the requisite number of turns is wound about the mandrel 35, one of the end plates 36 or 37, as the case may be, is removed and the coil 27 is removed from the mandrel 35. The coil 27 is then inserted in the container 25 of the sonobuoy portion 23. The outer end 39 of the coil 27 is fastened to a hydrophone 40 which is inserted within the hollow space 41 of the coil 27, the hollow space, of course, being larger than the diameter of the hydrophone 40. The inner end of the coil 27, or what may be considered the start of the winding thereof and numbered 42 is the part which is first unwound from the cable. The cover 26 is then placed over the cylindrical container 24 with the cable end 42 passing through a hole 44 in the base 45 of the cover 43. The cable end 42 is also inserted through a hole in a round plate 46 and is then passed through a hole 47 in the tapered end 48 of the cover 43. A lever 49 is fastened to the base 45 of cover 43 by a support member 49a and is pivotable about the axis 50. The end of the lever arm 49 is bent as shown at 51 to engage a catch 52 which is fastened to the container 24. The base 45 is slotted to permit the catch 52 to go therethrough when the cover 43 is placed in position over the cylinder 24. It is, of course necessary to have a plurality of catches and levers around the periphery of the container 24 and the cover 26 to insure a good closure. The coil 27 in operation is unwound starting from the inside of the winding and proceeding to the outside thereof and when it reaches a predetermined position towards the end of the winding, a knot or other stop on the cable 28, which is sufficiently large to pass through the hole 44, but will not pass through the hole in the plate 46, will then carry the plate 46 upwards and the plate 46 will trip the levers 49 to move upward thus releasing them from the catches 52. Stabilizing vanes or fins 53, of which only two are shown in view of FIG. 4, are fastened to the top of the cover 26 to stabilize the sonobuoy portion 23 in its rapid descent downward into the depths of the ocean. Cable 28 consists of a strand of high tensile steel and two copper conductors to provide electrical connection between the hydrophone 40 and the transmitter portion floating on the surface of the water. The copper cables provides for DC power for operation of the solid state elements in the hydrophone portion which consists of a transducer and a solid state preamplifier. The copper wire in the cable 28 also provides the AC path for signals returning from the hydrophone to the transmitter at the sea surface for retransmittal through the antenna 18. The steel strand should be sufficiently strong to withstand the strain as the sonobuoy portion 23 sinks and to support it.

In the floating sonobuoy portion 12 the cavity 22 serves a double purpose. Its primary purpose is to provide a stowage space for the hydrophone portion of the buoy. However, after the hydrophone portion 23 is ejected from the cavity, then water will enter the cavity partially filling it and thus provide a stabilization force tending, in association with the buoyant ring 16, to maintain the floating sonobuoy and the antenna 18 in an essentially stable and vertical condition. The air space within the cavity 22 will also provide an additional measure of buoyancy in addition to the buoyancy exerted by the buoyant ring 16. The twist that is imparted through the cable 28 by the winding device as shown in FIG. 5 tends to exert a force on the winding outwardly of the center axis thus permitting the cable 28 to be unwound from the center outwards by cancelling the twist that would otherwise develop in the cable and without thereby collapsing the winding or causing a tangle in the cable. The twist also contributes to low drag by permitting a fast payout of the cable 28 so that the cable hangs stationary in the water. Low drag payout is achieved in this invention by densely packing the cable as part of the sinking ballast, so that the cable is fed out as the hydrophone portion sinks. The low drag payout assures the very high speed of descent of the hydrophone to the depth determined by the cable length. In contrast, in the prior art when the cable is fed out from the floating portion of the sonobuoy there is always a great amount of drag and twisting caused by the movement of the great length of the cable as it is dragged through the water by the descending hydrophone unit.

Figure 6:
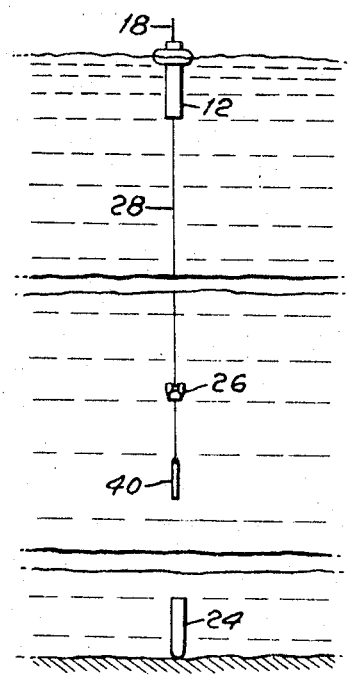
FIG. 6 is an illustration showing the disposition of the different portions of the sonobuoy after the cable payout is completed.

Referring to FIG. 6, there is shown the disposition of the portions of the sonobuoy at the end of the cable payout. Portion 12 with the transmitter floats on the surface. The container 24 is on the bottom of the ocean. Hydrophone 40 hangs at the end of the cable 28 with the cover 26 suspended therefrom and above the hydrophone, which is clear of all surrounding parts of the sonobuoy and ready to receive signals.

Figure 7:
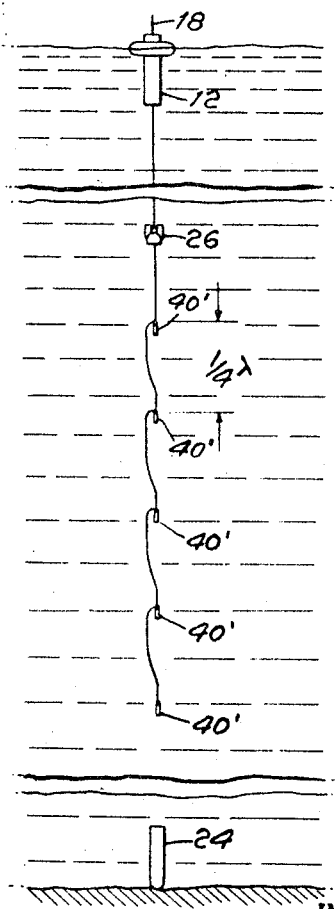
FIG. 7 is a second embodiment of the sonobuoy having a plurality of hydrophones.

In FIG. 7 is shown a second embodiment of the radio sonobuoy with a plurality of hydrophones 40' attached in parallel to the cable 28. The hydrophones 40' are disposed ¼λ apart depending on the frequency of the signal to be received. The distance between the hydrophones 40' equivalent to ¼λ at 3 kc., which is a frequency of interest in underwater detection, is 8 inches. The hydrophones 40' are tied into the cable 28 at the end thereof with this spacing. This arrangement provides for greater directivity and accuracy of detection. The hydrophones 40' are packed in tandem within the center 41 of the coil 27, and are released in the same manner as a single hydrophone. The hydrophones 40 are connected in parallel to the cable 28 and information therefrom is transmitted to the transmitter by the different frequency channels. The different frequencies are used to carry the phase difference signals from the hydrophones 40' so that greater directivity and accuracy of direction finding of intruding submarines is secured. The use of a plurality of hydrophones as described is equivalent to a linear antenna array known in the direction finding art which effectively provides a wide aperture antenna for greater accuracy of detection. Each of the hydrophone electronic circuits incorporate an oscillator operating at a frequency different from the other hydrophones and modulating the signals picked up by the hydrophones, thus providing different carriers for each hydrophone. The oscillator and modulator should be of the battery powered transistor type with low power drain which can be easily incorporated in the hydrophone 40'. An example of a suitable transistor oscillator is shown in U.S. Patent No. 2,62,337 and an example of a suitable modulator is disclosed in U.S. Patent No. 2,937,343. The audio output of the sound transducer of the hydrophone and the oscillator output are coupled in known manner to the modulator and the modulated output thereof is transmitted via the cable 28 to the transmitter. Within the hydrophone 40 an oscillator 50 is coupled to a modulator 51 by lead 52 as is the detected sound by means of lead 53. The output of the modulator 51 is coupled by lead 54 to the inner conductor of the cable 28.

While I have described above the principles of my invention in connection with specific apparatus, it is to be clearly understood that this description is made only by way of example and not as a limitation to the scope of my invention.

I claim:

1. A radio sonobuoy for release from high altitudes above the surface of a body of water comprising a first portion for controlling the descent of said sonobuoy in the air in two phases, said first portion allowing free fall of said sonobuoy in the first phase and having rotovanes rotatable about the axis of said sonobuoy during the second phase to retard the rate of fall of said sonobuoy, a second portion containing a transmitter, a third portion having stabilizing means, and means included in said third portion to sink said third portion to a great depth within said body of water at high speed to a predetermined depth, said third portion containing sound detection means, means to release said sound detection means from said third portion at said predetermined depth, means coupling the sound detection means of said third portion to said second portion, said second portion comprising a member having a cavity therein, said transmitter being carried by said member, buoyancy means carried by said member to support said member on the surface of the water, means to inflate said buoyancy means when said sonobuoy arrives in the water, said third portion being disposed in said cavity, and means releasing said third portion from the cavity when said second portion is floating on the surface of the water and allowing the water to partially fill the cavity to stabilize said second portion as it floats in the water.

2. A radio sonobuoy according to claim 1 wherein said third portion comprises a container, said sound detection means comprising a hydrophone disposed within said container, and said coupling means comprising a cable coupling said hydrophone to said transmitter of said second portion and payable out from said third portion when said third portion is released from said second portion and sinks in the water.

3. A radio sonobuoy according to claim 2 wherein said cable is coiled within said container and said hydrophone is disposed centrally of said coiled cable and said container and said cable is coiled for stowage within said container with a twist imparted to said cable whereby said coiled cable disposed within said container exerts a force outwardly against the walls of said container and said coil is unwound from the inside out as said cable is fed from said container during the descent of said third portion in the water.

4. A radio sonobuoy according to claim 3 wherein said third portion further comprises a cover adapted to fit over said container containing said hydrophone means securing said cover to said container, said stabilizing means being fastened to said cover, and said means to release said sound detection means from said third portion at a predetedmined depth include means cooperating with the unwinding of the cable from said coil to unfasten said securing means at a predetermined time and release said hydrophone from said container free from said cover and said container.

5. A radio sonobuoy according to claim 1 wherein said third portion comprises a container, said coupling means comprises a cable coiled within said container and coupled to said transmitter, a plurality of hydrophones disposed centrally of said container and said coiled cable, means coupling said hydrophones in parallel to said cable and spaced apart ¼λ of a desired frequency, each said hydrophone comprising an oscillator operating at a frequency different from the other oscillators of the other hydrophones, and a modulator whereby signal received by each said hydrophones is modulated by a characteristic frequency for that hydrophone.

(References on following page)

References Cited

UNITED STATES PATENTS

| | | | |
|---|---|---|---|
| 2,959,376 | 11/1960 | Saurma | 244—14 |
| 2,717,309 | 9/1955 | Campbell. | |
| 2,641,751 | 6/1953 | Mason et al. | 340—8 |
| 2,629,083 | 2/1953 | Mason et al. | 340—2 |
| 2,422,337 | 6/1947 | Chilowsky | 340—2 |
| 2,639,097 | 5/1953 | Scott | 242—159 |
| 2,790,186 | 4/1957 | Carapellotti | 9—8 |
| 3,006,002 | 10/1961 | Pingree et al. | 9—8 |
| 2,447,069 | 8/1948 | Holcomb | 340—2 |
| 2,978,668 | 4/1961 | Kurie et al. | 340—2 |
| 1,340,254 | 5/1920 | Rice | 242—159 |
| 2,973,911 | 3/1961 | Rayburn | 242—1 |
| 3,017,147 | 1/1962 | Robinson et al. | 244—138.1 |
| 3,093,808 | 6/1963 | Tatnall et al. | 340—2 |

FOREIGN PATENTS

| | | |
|---|---|---|
| 1,241,849 | 8/1960 | France. |

RICHARD A. FARLEY, Primary Examiner

U.S. Cl. X.R.

340—6